United States Patent

[11] 3,540,419

[72] Inventor Clarence D. Fox
Decatur, Illinois
[21] Appl. No. 764,240
[22] Filed Oct. 1, 1968
[45] Patented Nov. 17, 1970
[73] Assignee Borg-Warner Corporation
Chicago, Illinois
a corporation of Delaware

[54] SUPPLEMENTAL FUEL SYSTEM
3 Claims, 1 Drawing Fig.
[52] U.S. Cl. .................................................. 123/27,
123/120
[51] Int. Cl. ............................................. F02b 7/06
[50] Field of Search ........................................ 123/27(GAS),
119, 140.2, 140.3, 120

[56] References Cited
UNITED STATES PATENTS

| | | | |
|---|---|---|---|
| 2,244,669 | 6/1941 | Becker ........................ | 123/140.3 |
| 2,896,599 | 7/1959 | Ensign ......................... | 123/120 |
| 3,384,060 | 5/1968 | Dangauthier ................. | 123/140.2 |
| 3,421,483 | 1/1969 | Fox .............................. | 123/27(GAS) |
| 3,443,551 | 5/1969 | Laubach ...................... | 123/120 |

Primary Examiner—Laurence M. Goodridge
Attorney—Donald W. Banner, Lyle S. Motley, C. G. Stallings and William S. McCurry ABSTRACT: A supplemental fuel system for a diesel engine which delivers supplemental gaseous fuel to the engine intake system at high engine loads. The system senses inlet airflow to the engine and controls supplemental fuel system fuel delivery rate in response to inlet airflow.

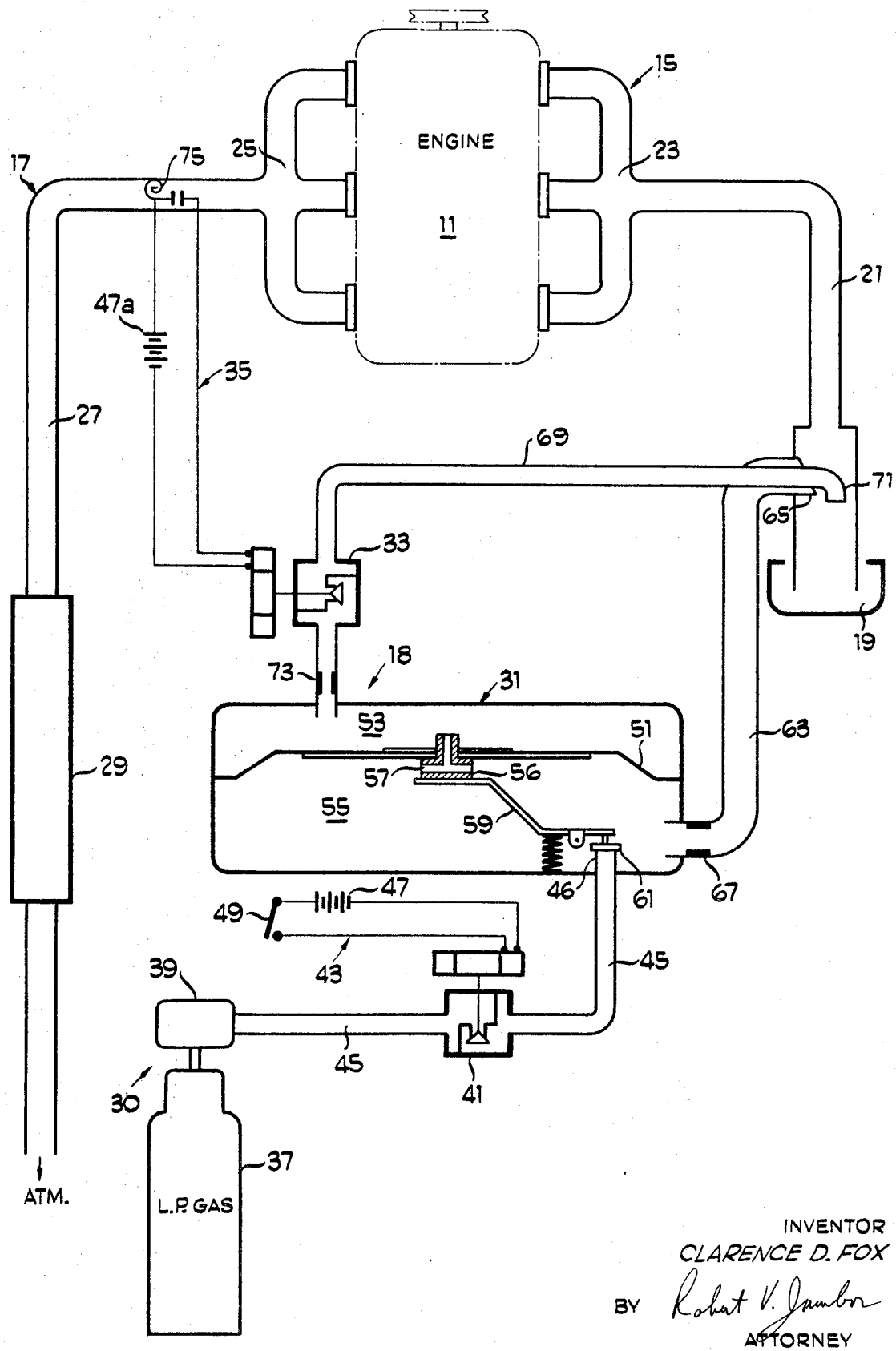

SUPPLEMENTAL FUEL SYSTEM

BACKGROUND OF THE INVENTION

This invention relates to a supplemental fuel system for a diesel engine. More particularly it relates to an automatically controlled system which delivers combustible gas to the intake air system of a diesel engine to increase the power capabilities of the engine under conditions of high load.

It is well known that the power output of a diesel engine may be significantly increased by the addition of combustible gas into the engine intake air. Engine horsepower may be substantially increased without any appreciable increase in smoke density or it may be maintained with an accompanying decrease in exhaust smoke.

Several systems have been developed to accommodate the addition of combustible gas to diesel engine intake air. Most of these systems, however, are manually controlled at the discretion of the operator and therefore consistent application in response to engine load is impossible.

Attempts have been made to provide a throttle controlled metering valve located in the gaseous fuel supply line to control the fuel delivery rate in response to engine throttle position. However, throttle position does not, in every case, accurately represent engine load and operation of the supplemental fuel system is therefore not restricted to conditions of high load where the extra horsepower is most effective. In addition, such arrangements have been proven to be difficult to install and their operation extremely complicated.

Most recently a system has been developed which automatically controls the addition of supplemental gaseous fuel in response to engine load. This system senses load through means responsive to engine exhaust temperature; a parameter which varies consistently with variations in load.

The system includes a regulator which controls gaseous fuel delivery. The regulator includes a movable diaphragm dividing the regulator into a pair of chambers. Each chamber is normally subjected to engine air intake system pressure sensed downstream of the inlet air filter. Once a predetermined minimum load is reached, a control valve is automatically actuated which places one chamber in communication with atmospheric pressure creating a pressure differential across the movable diaphragm. The diaphragm is caused to move and operate a fuel delivery valve to admit supplemental fuel into the engine intake system.

This system has proven extremely satisfactory in eliminating problems associated with previous methods. It has not, however, proven to be the ultimate solution to the application of supplemental fuel systems to diesel engines. The arrangement is insensitive to inlet airflow and for that reason cannot compensate for a reduction in flow by providing a corresponding reduction in fuel delivery rate. This is extremely significant in that inlet airflow varies substantially as the inlet air filter becomes contaminated.

Additionally, the system requires a communication between one chamber of the operating regulator and the atmosphere. This arrangement thereby provides a second source of air entering the engine inlet system and requires that appropriate measures be taken to provide adequate filtration.

Accordingly, it is the principal object of the present invention to provide an improved form of supplemental fuel system for a diesel engine which delivers supplemental gaseous fuel to the engine in response to engine load.

SUMMARY OF THE INVENTION

Very generally, the present invention is directed to a supplemental fuel system for a diesel engine which automatically delivers gaseous fuel to the engine air intake system at high operating loads. Additionally, the rate of fuel delivery is proportional to the inlet air velocity.

A regulator including a movable diaphragm controls the supplemental fuel delivery. After a minimum predetermined load has been achieved, the diaphragm is subjected to a differential pressure which varies with inlet airflow rate. The diaphragm moves in response to the established pressure differential to admit supplemental fuel in proportion to inlet airflow rate.

Additionally, the system operates solely in response to conditions of pressure existing internally of the engine inlet air system and connection to a second source of atmosphere is unnecessary.

Particular objects and advantages of the present invention will become readily apparent with reference to the following description and the accompany drawing.

DESCRIPTION OF THE DRAWING

The single FIG. is a schematic view showing a diesel engine incorporating a supplemental fuel system illustrating the principles of the present invention.

DETAILED DESCRIPTION

Referring now to the drawing, there is shown an embodiment of the supplemental fuel system including a diesel engine, generally designated 11, having an air intake system 15, an exhaust system 17 and a supplemental fuel system 18. The engine, including the inlet and exhaust systems, is generally typical of a conventional diesel engine and is included merely to provide a descriptive environment for the supplemental fuel system of the present invention.

The intake system includes an air filter 19, an intake duct 21 and an intake manifold 23. The exhaust system includes an exhaust manifold 25, an exhaust duct 27 and a muffler 29.

The engine additionally includes a primary fuel system (not shown) which supplies diesel fuel needed for normal operation. This fuel system may take any appropriate form and may include any conventional arrangement for distribution and metering of diesel fuel.

The supplemental fuel system 18 includes a source of combustible gaseous fuel 30, a secondary regulator 31, a pressure control valve 33 and a load sensing and control means 35.

The source of gaseous fuel 30 includes a pressurized supply tank 37, a primary regulator 39, supply valve 41 and actuator circuit 43.

Supply tank 37 contains a supply of gaseous fuel such as liquified petroleum (L.P.) gas although any other gaseous fuel would be suitable. The supply is connected to the secondary regulator 31 by delivery conduit 45 which includes an inlet end 46 disposed internally of the regulator 31.

The primary regulator 39, which may be any conventional demand regulator, is disposed along the conduit 45 intermediate the tank 37 and the valve 41. The regulator ensures fuel delivery at some predetermined positive pressure and eliminates surges in fuel delivery rate associated with an unregulated supply. An unregulated supply, however, may be used without departing from the scope of the invention.

The supply valve 41 is disposed along the conduit 45 intermediate the primary regulator 39 and the secondary regulator 31. This valve is a solenoid-type valve which is movable between an open and a closed position and provides positive shutoff for the supplemental fuel system when not in use. If desired, this valve may be a manually operable shutoff valve eliminating the need for actuator circuit 43.

The circuit 43 of the illustrated embodiment controls the operation of the supply valve 41. It includes a power source 47 connected to the valve 41 and an energization switch 49 connected in series between the power source and the valve. The switch 49 may be the running switch of the engine so that the supplemental fuel supply is available each time the engine is operated or it may be a separate switch used to open communication between the gaseous fuel supply and the regulator 31 when desired.

The secondary regulator 31 may be any one of a number of commercially available demand regulators and the particular regulator shown is not to be considered a limitation of scope but merely illustrative of an embodiment of the invention.

Specifically, the regulator 31 includes a hollow housing within which is disposed a flexible diaphragm 51 which divides the housing into a pressure chamber 53 and a pressure chamber 55. A plug 56 connected to the diaphragm defines a balance orifice 57 communicating between the chambers. This orifice allows for pressure equalization between the chambers but at the same time limits the flow rate between the chambers in the event of a pressure differential across the diaphragm.

An actuator arm 59 is pivotally supported within the chamber 55 and includes a valve cap 61 normally biased into gas tight sealing relation with the discharge end 46 of the delivery conduit 45. An end of the arm opposite the valve cap 61 is disposed in operative association with the plug 56 so that movement of the diaphragm toward the arm causes the arm to pivot and uncover the discharge end 46.

An intake system conduit 63 connects the pressure chamber 55 with the intake system intake duct 21 for delivery of gaseous fuel to the intake air system. The conduit includes an end disposed internally of the intake duct 21 which defines a fuel nozzle 65.

The nozzle is exposed to inlet airflow and is shaped to shield the open end of the conduit to prevent direct impingement of incoming air. Inlet air rushing through the inlet duct 21 will create a reduction in pressure or depression within the conduit proportional to flow. This depression will be communicated to the pressure chamber 55 by the conduit 63. A flow limiting orifice 67 is disposed in the conduit 63. This orifice is sized to control fuel flow rate through the conduit to the intake duct. It limits the rate of fuel flow at a given pressure drop across the orifice.

A control conduit 69 communicates between the pressure chamber 53 of the regulator 31 and the air inlet duct 21. An end of the conduit 69 disposed internally of the intake duct 21 forms an impingement probe 71 exposed to inlet airflow and facing directly upstream of the inlet airflow path. The probe is subjected to impingement of the flowing air stream which in turn causes an increase in pressure within the conduit proportional to intake velocity.

A surge inhibiting orifice 73 is disposed within the conduit to limit the maximum rate of flow within the conduit and prevent rapid variation in pressure within the chamber 53.

The pressure control valve 33 is connected to the control conduit 69 intermediate the regulator 31 and the inlet duct 21. This valve in the illustrated embodiment is a normally closed, solenoid-operated valve movable between open and closed positions to establish and terminate communication between the chamber 53 of the regulator 31 and the inlet duct 21.

The pressure control valve 33 is operated by the load sensing and control means 35. In the illustrated embodiment this means is an electrical network including a power source 47a and a thermal switch 75 which are connected in series with the solenoid valve 33. The power source 47a and the power source 47 may be a single power source, or if desired, separate power sources may be used.

The electrical network shown for sensing engine load is merely illustrative and any suitable arrangement for sensing load may be used. In this regard a hydraulically operated valve and a hydraulic actuator such as a fluid containing bulb exposed to engine exhaust temperature may be readily substituted for the electrical network without departing from the scope of the invention.

The thermal switch 75 is a normally open switch which closes upon reaching a predetermined minimum temperature to energize the solenoid valve 33 and open the communication between the chamber 33 and the probe 71. The switch is disposed in the exhaust duct 27 to sense exhaust gas temperature which provides a reliable indication of engine load.

The supplemental fuel system 18 is activated by closing the energization switch 49. This opens the solenoid valve 41 and communicates the supply of pressurized gaseous fuel with the secondary regulator 31.

The velocity of inlet air entering through the filter 19 and passing through the inlet duct 21 creates a depression proportional to inlet air velocity in the intake manifold conduit 63. This depression is communicated to the pressure chamber 55 of the regulator 31 through the conduit 63.

The balance orifice 57 in the plug 56 allows equalization of pressure between the chamber 53 and the chamber 55 and the diaphragm 51 remains in a neutral position. In this position, the actuator arm 59 is disposed such that the valve cap 61 closes the discharge end 46 of the delivery conduit 45 and no fuel enters the chamber 55.

When a predetermined minimum engine load is reached, the thermal switch of the load sensing and control means closes in response to exhaust temperature and actuates the solenoid valve 33. The valve, when energized, opens and provides communication between the chamber 53 of the regulator 31 an the inlet duct 21 at the pressure probe 71. The pressure probe 71 faces directly into the incoming air stream and is therefore subjected to an increase in pressure which varies with inlet air velocity. This increase in pressure is communicated to the chamber 53 creating a pressure differential across the diaphragm 51. The pressure differential moves the diaphragm toward the actuator arm 59 and the plug 56 urges the arm against the action of the biasing spring to open the discharge end 46 of the delivery conduit 45. Gaseous fuel then enters the chamber 55 and passes into the intake duct 21 through the intake system conduit 63 to provide supplemental fuel to the engine.

The depression sensed by the fuel nozzle 65 and pressure sensed by the probe 71 vary as the air velocity through the inlet duct 21 varies. Therefore should the inlet velocity decrease as a result of a dirty inlet air filter or the like, the differential pressure experienced by the diaphragm 51 is correspondingly decreased. This in turn results in a reduction in supplemental fuel delivery rate. The supplemental fuel system therefore is sensitive to and compensates for reduction in inlet air delivery rate.

The rate of flow of supplemental gaseous fuel into the engine at a given pressure drop is controlled by the size of the orifice 67. The diameter of orifice 73 is larger than the diameter of the balance orifice 57. In this way the differential experienced by the diaphragm 51 cannot be dissipated through the communication between chambers 53 and 55.

Placement of the orifice 67 in the conduit 63 and the orifice 73 in conduit 69 prevents undesirable surges in power when supplemental fuel delivery is begun or terminated. These orifices limit the flow rate through the conduits and thereby limit the rate of change of pressures acting upon the diaphragm. When the predetermined minimum load is reached and the valve 33 opens, the rate of increase in pressure within the chamber 53 is such that smooth application of supplemental fuel is experienced. Also, when the engine load drops below the predetermined minimum and the thermal switch 75 opens, causing the control valve 33 to close the control conduit 69, the orifice 57 limits the rate of pressure balancing between the chambers 53 and 55 providing smooth return to diesel operation.

It is also of importance to note that the supplemental fuel system does not require communication with an external source of atmospheric pressure. The system only senses conditions within the intake duct 21 and the need for additional means to provide filtration of the atmospheric reference is eliminated.

Various features of the invention have been particularly shown and described in connection with the illustrated embodiment of the invention. However, it must be understood that various modifications may be made without departing from the scope of the invention.

I claim:

1. A supplemental gaseous fuel system for a diesel engine having an air intake system and an exhaust system, said supplemental fuel system comprising:

an intake system conduit including an end portion defining a fuel nozzle disposed in an inlet duct of said intake system formed to prevent impingement of flowing air directly into said conduit to thereby create a reduction in pressure in said conduit proportional to inlet air velocity;

a control conduit including an end portion defining a pressure probe disposed in said inlet duct and formed to receive direct impingement of inlet air to thereby create a pressure increase in said control conduit proportional to inlet air velocity;

a demand regulator including a diaphragm defining first and second pressure chambers therein, said first chamber communicating with said control conduit and said second chamber communicating with said intake system conduit;

a source of combustible gaseous fuel selectively communicable with said second pressure chamber;

fuel regulating means arranged and disposed for preventing flow of said gaseous fuel into said second chamber in response to a pressure balance between said first and second chambers, and providing for flow of said gaseous fuel into said second chamber in proportion to a pressure differential between said first and second chambers in response to said differential pressure;

means for normally balancing the pressure between said first and second chambers including a plug secured to said diaphragm defining a balance orifice communicating between said chamber; and a pressure control valve disposed in said control conduit providing communication between said pressure probe and said first chamber in response to a predetermined engine load for communicating a pressure differential to said regulator proportional to the velocity of air flowing in said inlet duct, said regulator allowing flow of gaseous fuel into said intake system through said nozzle in proportion to said pressure differential.

2. A supplemental gaseous fuel system as claimed in claim 1 wherein said control conduit includes a surge inhibiting orifice to control the rate of pressure increase in said first chamber when said pressure control valve is moved to its open position, said surge inhibiting orifice having a larger diameter than the diameter of said balance orifice.

3. A supplemental gaseous fuel system as claimed in claim 2 wherein said intake system conduit includes a flow limiting orifice limiting the maximum rate of delivery of supplemental gaseous fuel.